United States Patent [19]

Jung

[11] Patent Number: 5,248,132
[45] Date of Patent: Sep. 28, 1993

[54] AIR SPRING STRUCTURE FREE FROM THE SHAKES OF A SUSPENDED ROTATOR

[75] Inventor: Kun S. Jung, Seoul, Rep. of Korea

[73] Assignee: SamSung Electronics Co., Ltd., Suwon, Rep. of Korea

[21] Appl. No.: 656,719

[22] Filed: Feb. 19, 1991

[30] Foreign Application Priority Data

Dec. 30, 1989 [KR] Rep. of Korea .................. 1990/3012

[51] Int. Cl.⁵ ............................................. F16F 9/04
[52] U.S. Cl. ............................ 267/64.23; 267/64.27; 267/64.19; 267/35
[58] Field of Search ............... 267/64.11, 64.19, 64.27, 267/64.23, 64.25, 34, 122, 123, 113, 152, 35, 141; 248/632, 638

[56] References Cited

U.S. PATENT DOCUMENTS

| | | | |
|---|---|---|---|
| 1,516,004 | 11/1924 | Eckrode et al. | 267/64.23 |
| 2,290,337 | 7/1942 | Knauth | 267/64.23 |
| 2,685,425 | 8/1954 | Wallerstein, Jr. | 248/621 |
| 3,218,101 | 11/1965 | Adams | 267/141 |
| 3,391,922 | 7/1968 | Axthammer | 267/64.23 |
| 3,509,742 | 5/1970 | Bauer | 267/152 |
| 3,790,146 | 2/1974 | Hoffman et al. | 267/64.29 |
| 4,109,899 | 8/1978 | Takatsa | 267/152 |
| 4,738,434 | 4/1988 | Marjoram et al. | 267/35 |
| 4,899,997 | 2/1990 | Thorn | 267/35 |

Primary Examiner—Joseph F. Peters, Jr.
Assistant Examiner—Virna L. Ansley
Attorney, Agent, or Firm—Robert E. Bushnell

[57] ABSTRACT

An air spring structure, for preventing the shaking of a suspended rotator by absorbing/preventing the vibrations of the rotator in a commercial or household machine, comprises a body made of soft rubber materials, the body being provided with an inner cylindrical and outer cylindrical portion and an upper and lower supporting portions to thereby form an annular air chamber therein, a longitudinal through hole being defined by an inner cylindrical portion at the center. The hardness of the soft rubber materials forming the body are below 30 to 40 Shore (A). The thicknesses of the inner cylindrical portion and the outer cylindrical portion are thinner than those of the upper and lower supporting portions, and the ratio of horizontal stiffness (kh) to vertical stiffness (kv) is between 0.7 to 1.5 so as to allow the prevention of vertical dynamic displacements as well as specific excessive dynamic displacements during the rotation of a suspended rotator, whereby, fouling from the rotator striking surrounding structures when off-balance due to irregularly complex forces is prevented, each of the complex forces having dynamic displacements or amplitudes different from one another due to the unbalanced mass and center of rotation of a suspended rotator.

51 Claims, 7 Drawing Sheets

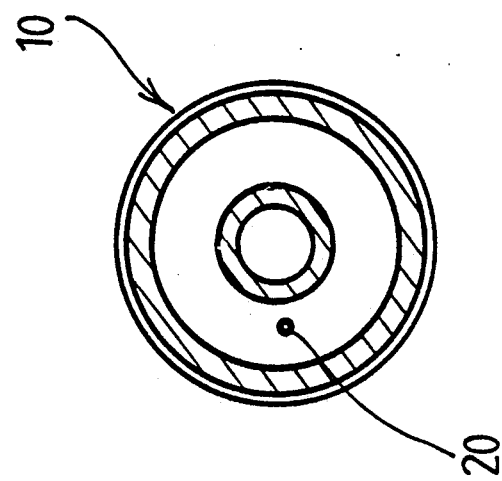
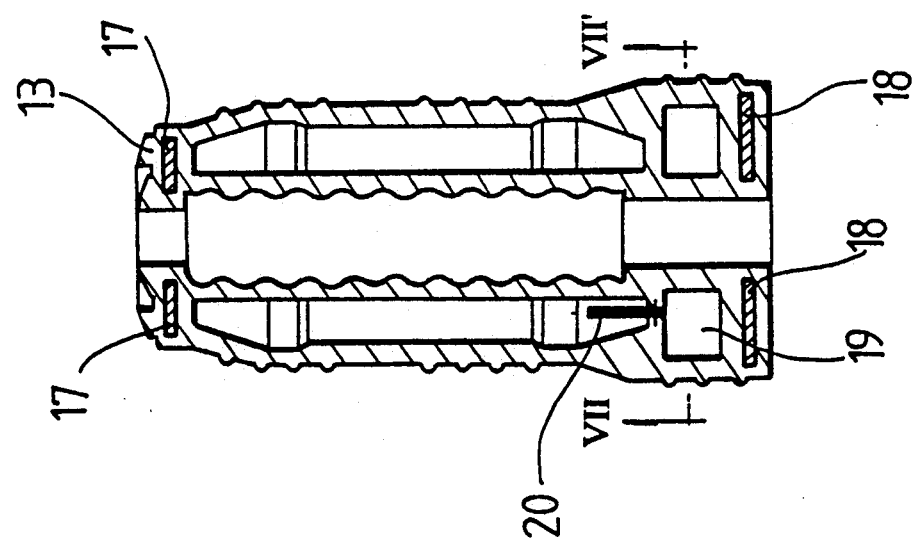

AIR SPRING STRUCTURE FREE FROM THE SHAKES OF A SUSPENDED ROTATOR

BACKGROUND OF THE INVENTION

The invention relates to an air spring for preventing the shakes of a machine component mounted on the area subject to the generation of vibrations, and particularly, to an air spring structure for isolating a suspended rotator by absorbing/preventing the vibrations of the rotator generated in a commercial or household machine. Specifically, the air spring helps to prevent fouling of the rotator in which the rotator strikes surrounding structures. The fouling is caused by the rotator spinning while unbalanced, thereby generating irregularly complex forces, each of the complex forces having dynamic displacements or amplitudes, different from one another, due to the unbalanced mass and center of a suspended rotator.

Generally, coil springs have been used in preventing vibrations in machines. A conventional coil spring can stop an up and down trembling motion, also called general dynamic displacement. But, in the case of a rotator suspended by a hooking member with unbalanced center or gravity by a specific dynamic displacement moving to and fro, left and rightward, and up and downward, the oscillating amplitudes of the rotator are increased differently at any direction, while the complex force directions were made irregular, thereby creating specific excessive shakes. A fouling phenomena occurs as a result of the rotator contacting surrounding structures which leads to failure or the breakage of machine components.

The typical example of a suspended rotator is a rotating barrel in a washing machine, in which the rotating barrel is mounted in an external barrel using a coil spring as shown in FIG. 12. For example, external barrel 2 is provided with rotating barrel 3 supported rotatably on rotating shaft 4, which is passed through the bottom center portion of external barrel 2. Rotating shaft 4 is connected through pulley 9 to motor 8 mounted on the bottom of external barrel 2. Bracket 5 projects from the lower periphery of the external barrel 2. Hooking member 6 fixed on the upper portion of cabinet 1 is passed through bracket 5 to couple at its lower end the coil spring 7. Thus, when rotating barrel 3 is rotated by pulley 9 during the operation of motor 8, coil spring 7 absorbs the vibrations of external barrel 2.

But, rotating barrel 3 of the suspended rotator in a washing machine has a center of rotation different from its center of gravity because of the random state of the washing materials. The unbalanced state of rotating barrel 3 induces different amplitudes or irregular complex forces in each direction, called specific excessive shakes. This causes the fouling by hitting of surrounding structures, for example cabinet 1, around the external barrel 2. Thus, in order to prevent the fouling phenomena, the absorption/prevention of specific excessive shakes in each direction as well as heneral vibrations is required.

The coil spring structure can only absorb general vibrations moving upward and downward, for example vertical dynamic displacements, but it has difficulty preventing the specific excessive snakes. As the mass and weight of rotating barrel 3 is uneven, the oscillating motions of hooking member 6 having a predetermined length is made to move upward, downward, leftward and rightward or non-uniform complex forces different from one another in each direction while being relatively larger. As a result, a fouling phenomena can occur.

If coil springs each having a different stiffness are individually mounted at different positions, the center of a rotator moves in an oval pattern during the operation of a suspended rotator centering on the X-axis and the Y-axis. When forced vibrations (w) were larger than natural frequency (wny) of Y-axis direction but less than natural frequency (wnx) (wny<w, wnx >w), an off-balanced rotator is reversely rotated. When forced vibrations (w) were equal to natural frequency (wny, wnx), the resonant phenomena occurred to induce a more serious fouling phenomena.

In a shake preventing structure using a conventional coil spring shown in FIG. 12, the vibrations of rotating barrel 3 are transferred through the coil spring's elastic force to bracket 5 to the upper portion of coil spring 7, returning it downward through coil spring's turns to the lower end of hooking member 6 and delivering it again through hooking member 6 to the upper portion of cabinet 1. At that time, the vibration of rotating barrel 3 generate noises due to its rotation as well as secondary noises due to dynamic motions in the course of passing each turn of coil spring 7. It is undesirable in the fact that these secondary noises resonate and are amplified by structures surrounding the rotator.

The other shake preventing structure, performing better than a conventional coil spring, is shown in FIG. 13. A plurality of bodies B are provided with a rubber liner L and at least one flange Pg formed at the opening portions of its upper and lower ends. Rubber liner L having air inflated therein is coated by two layers P1 and P2 of fiber reinforced rubber materials. On the outermost to rubber liner L there is formed an outer compressed rubber sheath C. Finally, the flanges Pg are each sealed to form an air spring.

The air spring is more effective than a coil spring in absorbing the vibrations of industrial beavy machinery fixed in a predetermined position, for example a pump, a blower and a compressor, etc. Nevertheless, it does not work well in preventing the fouling phenomena, because the X-axis and Y-axis dynamic displacements of a suspended rotator are not completely removed.

This air spring generally had horizontal stiffness (kh) of about 0.2 to 0.3 relative to vertical stiffness (kv) so that upward and downward dynamic displacements are more or less absorbed. But, if the mass and weight of a rotator were uneven, the dynamic displacements, such as specific excessive shakes, are not prevented, the amplitudes of specific excessive shakes at each direction are made larger, and their complex force directions are irregular, thereby inducing the fouling phenomena by the rotator striking surrounding structures.

This air spring includes body B provided with compressed rubber inner liner L, two reinforced fiber rubber layers P1, sheath C made of compressed rubber materials and at least one of the flanges Pg sealed at its upper and lower opening portions. Therefore, manufacturing is very complicated, expensive, and mass-production is very difficult.

The main object of the invention is to provide an air spring structure free from the shakes of a suspended rotator by absorbing/preventing the vibrations of rotators mounted in commercial wr household machine equipment, in which it prevents the fouling phenomena in which the rotator strikes surrounding structures while rotating in an unbalanced condition thereby generating unevenly complex forces, each complex force having dynamic displacements or amplitudes different from one another due to the unbalanced mass and weight of a rotator.

The other object of the invention is to provide an air spring structure for reducing the noises of a suspended rotator during rotation.

Another object of the invention is to provide an air spring structure for effectively preventing the shakes of a suspended rotator or a fixed structure.

Another object of the invention is to provide an air spring structure having a simple configuration and features which can be easily manufactured by mass-production at a reduced manufacturing cost.

SUMMARY OF THE INVENTION

In order to achieve these and other objects of the invention, an air spring structure for suppressing the shakes of a suspended rotator comprises a body made of soft rubber materials. The body is provided with an inner cylindrical portion, an outer cylindrical portion and at least one supporting portion at its upper and lower portions thereby to form an annular air chamber, in which compressed air is contained. At the center a longitudinal through hole defines an inner cylindrical portion.

When the hardness of soft rubber material forming a body is below 30 or 40 Share A, and the thicknesses of an inner cylindrical portion and an outer cylindrical portion are thinner than those of upper and lower supporting portions, the ratio of horizontal stiffness kh to vertical stiffness kv is fixed at 0.7 to 1.5 so as to allow the prevention of vertical dynamic displacements as well as specific excessive dynamic displacements during the rotation of a suspended rotator.

Furthermore, a spiral reinforcing projecting member is formed on an inner cylindrical portion, and a plurality of annular projecting members are made on an outer cylindrical portion, so that the average thicknesses of the inner and outer portions may be reduced to meet the objects of the invention.

The body of the invention may be reinforced by laying circular metal plates under its upper and lower supporting portions.

According to the another embodiment of the invention, an air spring structure, for preventing the shakes of a suspended rotator, comprises a body made of soft rubber materials. The body is provided with an inner cylindrical portion, an outer cylindrical portion and at least one supporting portion at its upper and lower portions to form an annular air chamber, in which compressed air is contained. At the center a longitudinal through hole is defined by the inner cylindrical portion. In the lower supporting portion there is formed an auxiliar air chamber communicating through a nozzle tube member with the air chamber.

According to another embodiment of the invention, an air spring structure for preventing the shakes of a suspended rotator comprises a body made of soft rubber materials. The body is provided with an inner cylindrical portion, an outer cylindrical portion and upper and lower supporting portions thereby to form an annular air chamber, in which compressed air is contained. At the center, a longitudinal through hole is defined by the inner cylindrical portion. An upper cylindrical partition extends downwardly and integrally from the upper supporting portion to be partly overlapped with a lower cylindrical partition extending upwardly and integrally from the lower supporting portion to divide the air chamber into two regions; an air chamber on its outer side and an second air chamber on its inner side.

One of the first and second air chambers is formed narrower than the other so that a pressure difference between them may occur when the dynamic displacements are transferred in each direction. At that time, compressed air flows between both the first and second air chambers through a plurality of clearances which are formed on both partitions. The drag force of both partitions generated during air flow allows the body to absorb the energy according to the dynamic displacements, so that it may promote the effect for preventing the shakes of a rotator.

These partitions have a plurality of ventilating grooves formed vertically around their peripheral portions to regulate the flow of compressed air between them.

According to another embodiment of the invention, an air spring structure for preventing the shaking of a suspended rotator comprises a body made of soft rubber materials. The body is provided with an inner cylindrical portion, an outer cylindrical portion and at least one supporting portion for its upper and lower portions thereby defining an annular air chamber, in which compressed air is filled. At the center a longitudinal through hole is defined by the inner cylindrical portion. A pressure regulating tube member is introduced from the air chamber to the exterior to uniformly regulate the pressure of each chamber. Therefore, when at least two dynamic displacements corresponding to any one of a plurality of air spring structures mounted on a suspended rotator are applied to all air spring structures, these complex forces different from one another, which are generated at any direction to each structure, are made equal.

BRIEF DESCRIPTION OF THE DRAWINGS

The invention will be explained in detail by reference to the accompanying drawings, in which:

FIG. 6 is a longitudinal cross-section view showing an air spring structure according to another embodiment of the invention;

FIG. 7 is a cross-sectional view showing cut along line VII-VII' of FIG. 6;

DETAIL DESCRIPTION OF THE INVENTION

Figure 2:
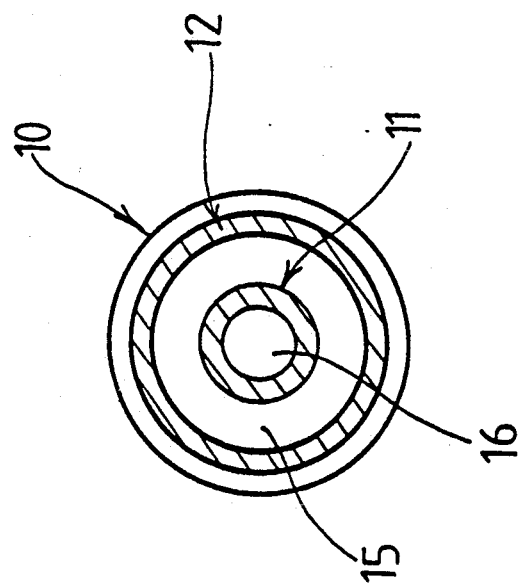
FIG. 2 is a cross-sectional view showing cut along line II—II' of FIG. 1.
Figure 1:
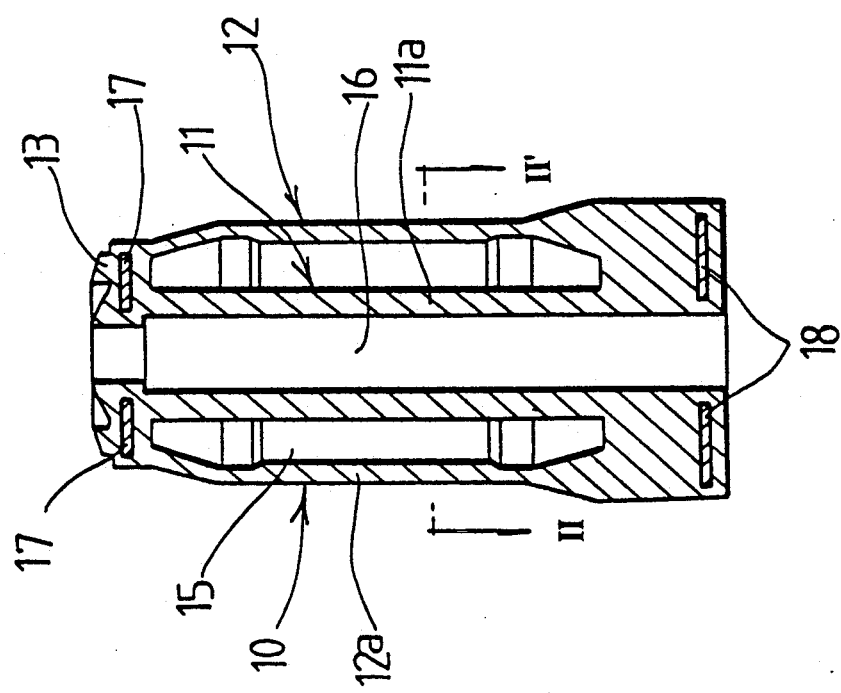
FIG. 1 is a longitudinal cross-section view showing an air spring structure according to one embodiment of the invention.

FIG. 1 to FIG. 5 show one embodiment of the invention. An air spring structure includes body 10 made of soft rubber materials. Body 10 is provided with inner cylindrical portion 11, outer cylindrical portion 12 and supporting portions 13, 14 at its upper portion and lower portion thereby to form annular air chamber 15. At the center portion of body 10, through hole 16 is defined by inner cylindrical portion 11.

Body 10 is made of soft rubber having the hardness of less than 30 to 40 Shore (A). The thicknesses of inner and outer cylindrical portions 11 and 12 are made thinner than those of upper and lower supporting portions 13 and 14, so that the ratio of horizontal stiffness (kh) to vertical stiffness (kv) of the body 10 may be higher over that of a conventional air spring.

The ratio of horizontal stiffness (kh) to vertical stiffness (kv) is preferably 0.7 to 1.5. When body 10 is mounted to support a suspended rotator, it is desirable to absorb the upward and downward dynamic displacements as well as the leftward and rightward dynamic displacements.

Inner wall 11a of inner cylindrical portion 11, defining through hole 16, has 0.7 to 1.5 the ratio of horizontal stiffness (kh) to vertical stiffness (kv) and the thickness enough not to be expanded, when compressed air is charged into the air chamber, so that the inner diameter of through hole 16 does not contract.

Outer cylindrical portion 12 also has a ratio of the stiffness (0.7 to 1.5) and has enough thickness not to be excessively expanded to the exterior, when compressed air is charged into air chamber 15.

Figure 3:
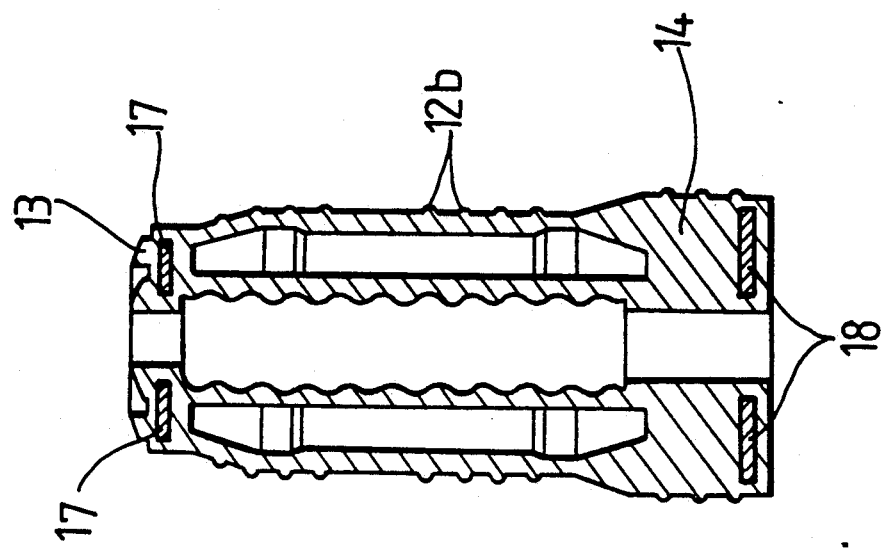
FIG. 3 is a longitudinal cross-sectional view showing an example modifying an inner cylindrical portion according to the invention.

FIG. 3 shows a modified example of the inner cylindrical portion 11. The average ,hickness of inner cylindrical portion 11 is made thinner than shown in FIG. 1, but inner wall 11a of inner cylindrical portion 11 is provided with spiral reinforcing projector 11b formed thereon in order to prevent the contraction of the through hole 16, when compressed air is charged into Spiral reinforcing projector 11b is of course set to meet the stiffness of 0.7 to 1.5, which is the ratio of horizontal stiffness (kh) to vertical stiffness (kv).

Figure 4:
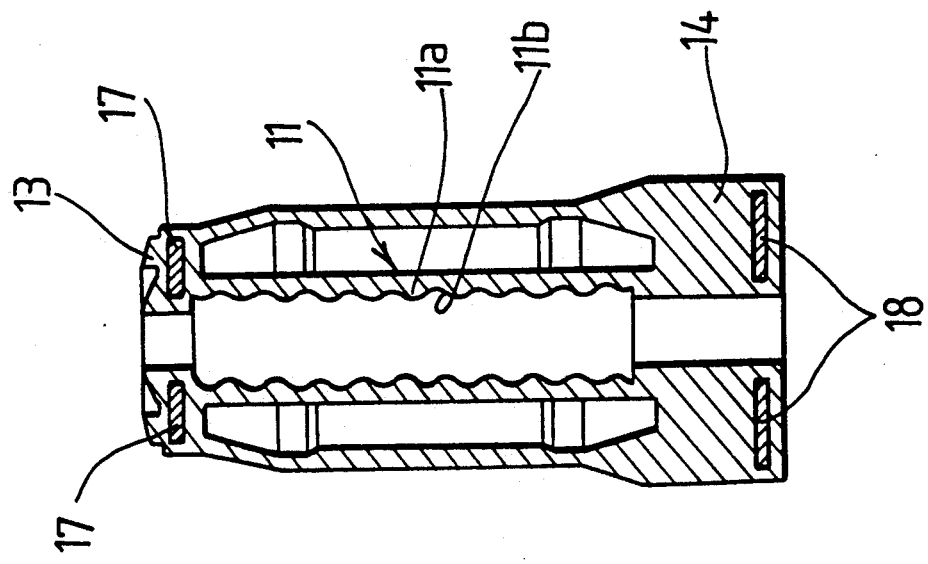
FIG. 4 is a longitudinal cross-sectional view showing an example modifying an outer cylindrical portion according to the invention.

FIG. 4 is illustrates a modified example of outer cylindrical portion 12. The average thickness of outer cylindrical portion 12 is formed thinner than that of the example in FIG. 1, but its outer wall has a plurality of annular projections 12b for maintaining the predetermined stiffness of body 10 and preventing the excessive expansion of outer cylindrical portion 12 to the exterior.

Upper and lower supporting portions 13 and 14 of body 10 are provided with reinforcing plates 17 and 18 of a circular metal plate immersed therein to reinforce them in supporting a suspended rotator.

Figure 5:
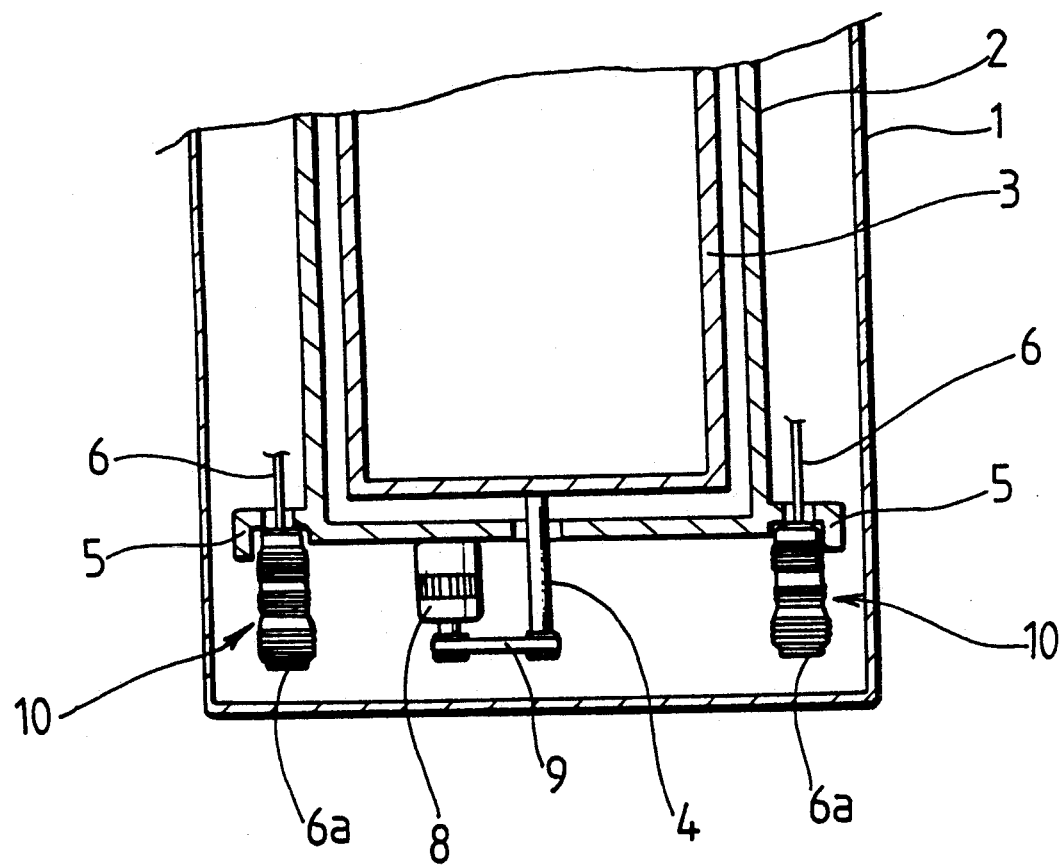
FIG. 5 is a cross-sectional view showing the mounted invention.

FIG. 5 is an example illustrating the mounting of an air spring structure to prevent shaking of a suspended rotator to a rotating barrel of a washing machine. External barrel 2 is provided with rotating barrel 3 mounted therein while being supported on rotating shaft 4. Bracket 5 is extended outwardly from the peripheral of external barrel 2. A predetermined number of hooking rods 6 properly fixed to the upper portion of cabinet 1, are passed through bracket 5 to couple at their lower ends with the air spring structure 10, in which at least one air spring structure can be mounted between the lower ends of hooking rods 6 and lower bracket 5. Motor 8 is mounted on the bottom of external barrel 2 to transfer its operating force through belt pulley 9 to supporting shaft 4. When motor 8 is operated to rotate rotating barrel 3, air spring structure 10 can absorb the shakes of rotating barrel 3.

In other words, hooking rod 6 is fitted into through hole 16 defined by inner cylindrical portion 11. Upper supporting portion 13 is closely adhered to the bottom surface of bracket 5. Lower supporting portion 14 is closely contacted with enlarged head portion 6a formed at the lower end of hooking rod 6. Therefore, external barrel 2 supporting rotating shaft 4 of rotating barrel 3 is suspended in cabinet 1 through hooking rod 6 fixed at the upper of cabinet 1.

In the configuration described above, the shakes, which are referred to as dynamic displacements occur in any direction due to the rotation of rotating barrel 3, are transferred through bracket 5 of external barrel 2 to air spring structure 10, when washing materials are thrown into rotating barrel 3 and rotating shaft 4 is rotated. Then, the shakes are blocked or absorbed by air chamber 15 to prevent the fouling phenomena, which means the dynamic displacement amplitudes of an off-balanced rotator being increased in any direction and their complex force directions being made irregular.

For example, the distribution of the mass relative to the center axis of rotating barrel 3 is non-uniform due to the washing materials thrown into the rotating barrel 3, which is a suspended rotator. If its center is biased, rotating barrel 3 generates upward and downward dynamic displacements as well as leftward and rightward dynamic displacements. These dynamic displacements are transferred through rotating shaft 4 to external barrel 2 and then through bracket 5 to air spring structure 10 mounted between bracket 5 and enlarged head portion 6a at the lower end of hooking rod 6. At that time, air chamber 15 is expanded or contracted horizontally or vertically, according to the shapes or sizes of dynamic displacements applied to upper supporting portion 13, so that the dynamic displacements may be blocked or absorbed.

Herein, it is noted that an air spring structure of the invention should be set relatively higher in the manner that the ratio of horizontal stiffness (kh) to vertical stiffness (kv) is considered 0.7 to 1.5. With it, vertical dynamic displacements as well as the complex excessive dynamic displacements are smoothly absorbed or prevented.

Thus, forced frequency (w) of rotating barrel 3 and the fouling phenomena of the reverse rotations in a suspended rotator due to natural vibration (wnx, wny) of an air spring structure do not occur. Also, even though the mass and center of the suspended rotator are non-uniform, the fouling phenomena does not occur. The resonant phenomena obtained by conforming frequencies of a suspended rotator to natural vibrations of an air spring structure occur at relatively wider oscillating ranges, which can be effectively controlled over that of a coil spring.

Hooking rods 6 are fitted into corresponding through holes 16 formed at the center of body 10. It is very convenient to support a suspended rotator. The formation of an air spring structure is accomplished using soft rubber materials to facilitate its manufacture as well as to reduce its manufacturing cost.

FIG. 6 and FIG. 7 show another embodiment of the invention; the same as the first embodiment except for the configuration described below. Auxiliary air chamber 19 is made in the form of a cavity in the thickness portion of lower supporting portion 14 in body 10. Air chamber 15 and auxiliary air chamber 19 communicate through nozzle tube 20 with each other.

In this embodiment, when air chamber 15 is expanded or contacted by the dynamic displacements transferred to upper supporting portion 13 of body 10, compressed air in air chamber 15 and auxiliary air chamber 19 flows through nozzle tube 20 between air chamber 15 and auxiliary air chamber 19. It acts to absorb the energy by the dynamic displacements applied to body 10, thereby obtaining better prevention of the shaking of a suspended rotator.

In other words, on the assumption that dynamic displacements occur in a suspended rotator are applied to body 10 and compressed air in air chamber 15 is expanded, compressed air in air chamber 15 is introduced through nozzle tube 20 into auxiliary air chamber 19. Then, since the cross-sectional area of nozzle tube 20 is much narrower than that of auxiliary air chamber 19 to induce the fluid resistance in the course of passing compressed air through nozzle tube 20, energy of dynamic displacements may be absorbed.

Figure 9:
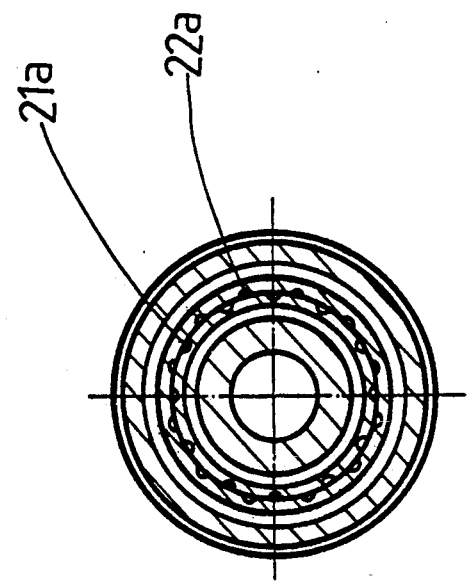
FIG. 9 is a cross-sectional view showing cut along line IX-IX' of FIG. 8.
Figure 8:
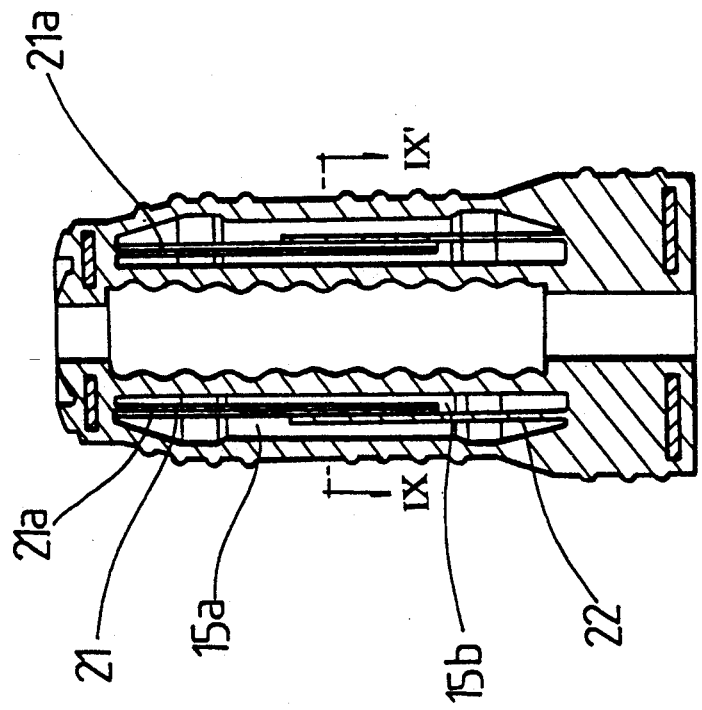
FIG. 8 is a longitudinal cross-section view showing an air spring structure according to another embodiment of the invention.

FIG. 8 and FIG. 9 illustrate another embodiment of the invention which is the same as first embodiment except for the configuration described below. Upper cylindrical partition 21 is extended integrally from the bottom surface of upper supporting portion 13 into air chamber 15 of body 10. Lower cylindrical partition 22 is projected integrally from the upper surface of lower supporting portion 14 into air chamber 15. Herein, upper cylindrical portion 21 and lower cylindrical portion 22 are overlapped a predetermined distance with each other to divide air chamber 15 into first air chamber 15a and second air chamber 15b.

One of the air chambers 15a and 15b is made narrower than the other. It differentiates pressures in the first air chamber 15a and second air chamber 15b, so that the compressed air on one side of the chambers 15a and 15b, having a relatively larger pressure is pushed through clearances between cylindrical partitions 21 and 22 into the other chamber, thereby absorbing the energy according to dynamic displacements applied to body 10.

In other words, the pressure of compressed air in the first or second air chambers 15a and 15b is made larger than the other because of a wider cross-sectional area according to Pascal's principle. The pressure difference forces the compressed air to move from a larger pressure chamber through clearances between partitions 21 and 22 into a smaller pressure chamber. At that time, the energy according to dynamic displacements is absorbed by the fluid resistance during the movement of pressures.

On the other hand, partitions 21 and 22 each have a plurality of ventilating grooves 21a or 22a formed vertically on their peripheral surface to regulate the fluid resistance of the compressed air passing through the clearances. The ventilating grooves are staggered against each other.

In this embodiment, it is noted that the fluid resistance from passing compressed air through the ventilating grooves 21 and 22 as well as a relatively larger ratio of horizontal stiffness (kh) to vertical stiffness (kv) enhances the effect for preventing the shakes of a suspended rotator.

Figure 10:
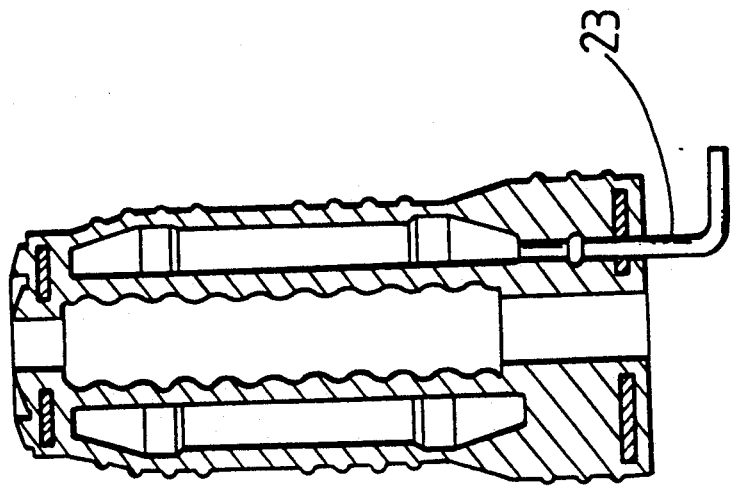
FIG. 10 is a longitudinal cross-section view showing an air spring structure according to another embodiment of the invention.
Figure 11:
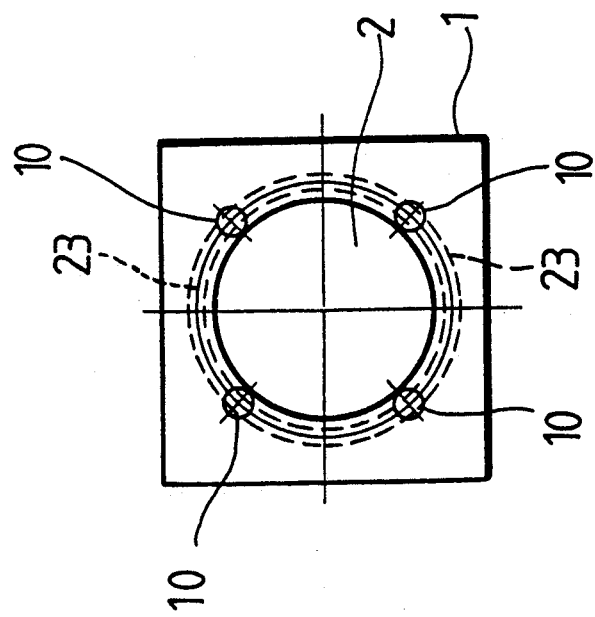
FIG. 11 is a cross-sectional view illustrating the mounting of an air spring structure around a rotator.
Figure 12:
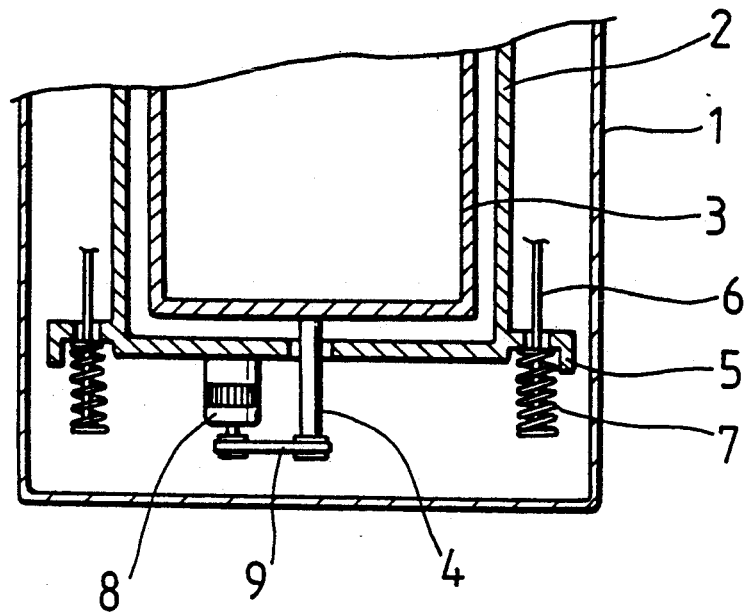
FIG. 12 is a cross-sectional view showing a vibration preventing device of a suspended rotator using a conventional coil spring; and, FIG. 13 is a cross-sectional view showing a conventional air spring.
Figure 13:
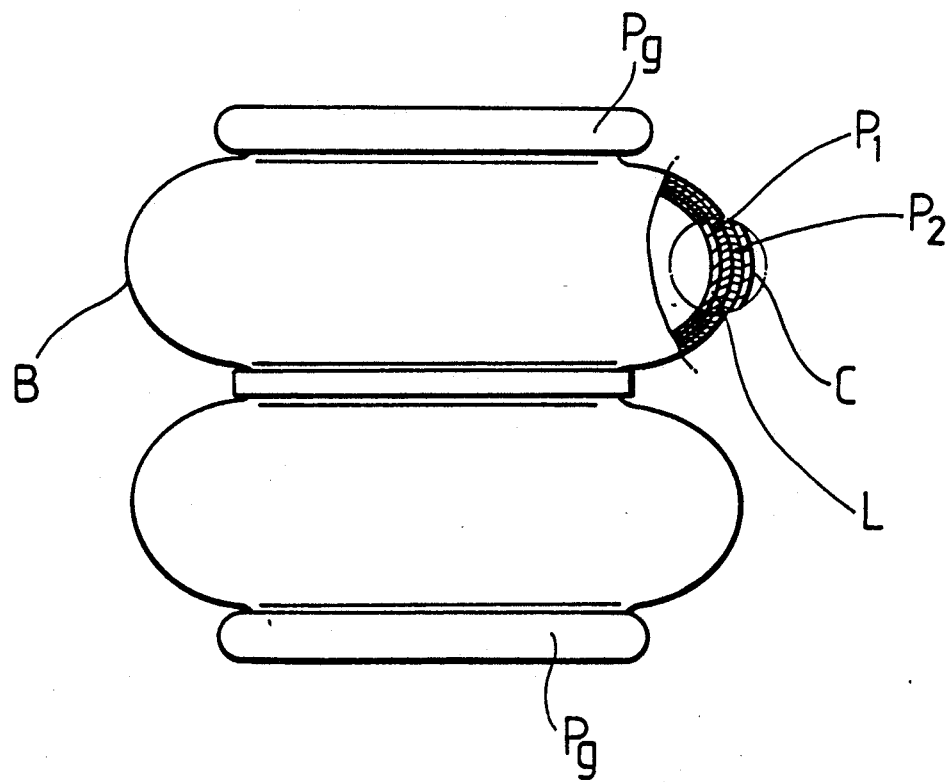

FIG. 10 and FIG. 11 show another embodiment of the invention which is the same as that of the first embodiment except for the configuration described below. Pressure regulating tube 23 is extended from air chamber 15 to the exterior of an air spring structure so as to communicate air chamber 15 with the atmosphere.

According to this embodiment, when a pressure regulating tubes 23 is mounted on each of several air spring structures for supporting a suspended rotator, any one of the air spring structures may be pressed by a larger external force of dynamic displacements than others during the rotation of a suspended rotator. At that time, compressed air in the air chamber of an air spring structure under the external large force flows into the air chamber of any other air spring structure under external small force, so that the pressure of compressed air in each of the air chambers may be evenly regulated to effectively absorb the biased dynamic displacements of a suspended rotator.

As described above, an air spring structure according to the invention can effectively absorb/prevent vertical dynamic displacements as well as complex dynamic displacements including vertical and horizontal dynamic displacements, called excessive shakes in any direction, in a commercial or household suspended rotator, such as a washing machine, and etc. Thus, it can prevent the fouling phenomena of striking any structures around a suspended rotator due to the unbalanced mass and center of rotation of a suspended rotator as well as reduce noise during the rotation of a suspended rotator. Its configuration is simple, its manufacturing is easy and its manufacturing cost is reduced.

Also, the prevention of the shakes relative to a suspended rotator according to the invention is effectively adapted to the prevention of the shakes relative to a suspended fixed structure.

What is claimed is:

1. An air spring for suppressing shaking of a suspended rotator, said air spring comprising:
   a body made of resilient material comprising an outer substantially cylindrical portion and an inner substantially cylindrical portion concentrically disposed relative to each other and axially joined at an upper end and a lower end by an upper supporting portion and a lower supporting portion, respectively, said outer substantially cylindrical portion, said inner substantially cylindrical portion, upper supporting portion, and said lower supporting portion defining an annular chamber extending entirely around an outer circumference of said inner substantially cylindrical portion, wherein a longitudinal through hole is formed axially through a center of said inner substantially cylindrical portion for receiving a hooking member.

2. An air spring as claimed in claim 1, wherein a hardness of said resilient material is below 30 Shore (A).

3. An air spring as claimed in claim 1, wherein said inner substantially cylindrical portion and said outer substantially cylindrical are thinner than said upper supporting portion and said lower supporting portion.

4. An air spring as claimed in claim 1, wherein a ratio of horizontal stiffness to vertical stiffness of said body is 0.7 to 1.5.

5. An air spring as claimed in claim 1, wherein a spiral reinforcing projector member is formed on an inner peripheral wall of said inner substantially cylindrical portion.

6. An air spring as claimed in claim 1, wherein a plurality of annular projecting members are formed on an outer peripheral wall of said outer substantially cylindrical portion.

7. An air spring as claimed in claim 1, wherein said upper supporting portion and said lower supporting portion comprise at least one circular reinforcing metal plate.

8. An air spring for suppressing shaking of a suspended rotator, said air spring comprising:

a body made of resilient material comprising an outer substantially cylindrical portion and an inner substantially cylindrical portion concentrically disposed relative to each other and axially joined at an upper end and a lower end by an upper supporting portion and a lower supporting portion, respectively, said outer substantially cylindrical portion, said inner substantially cylindrical portion, upper supporting portion, and said lower supporting portion defining an annular chamber extending entirely around an outer circumference of said inner substantially cylindrical portion, said annular chamber being filled with a fluid;

a longitudinal through hole formed axially through a center of said inner substantially cylindrical portion for receiving a hooking member; and a nozzle tube member mounted to communicate said annular chamber with an auxiliary fluid chamber.

9. An air spring as claimed in claim 8, wherein a hardness of said resilient material is below 30 Shore (A).

10. An air spring as claimed in claim 8, wherein said inner substantially cylindrical portion and said outer substantially cylindrical are thinner than said upper supporting portion and said lower supporting portion.

11. An air spring as claimed in claim 8, wherein a ratio of horizontal stiffness to vertical stiffness of said body is 0.7 to 1.5.

12. An air spring as claimed in claim 8, wherein a spiral reinforcing projector member is formed on an inner peripheral wall of said inner substantially cylindrical portion.

13. An air spring as claimed in claim 8, wherein a plurality of annular projecting members are formed on an outer peripheral wall of said outer substantially cylindrical portion.

14. An air spring as claimed in claim 8, wherein said upper supporting portion and said lower supporting portion comprise at least one circular reinforcing metal plate.

15. An air spring for suppressing shaking of a suspended rotator, said air spring comprising:

a body made of resilient material comprising an outer substantially cylindrical portion and an inner substantially cylindrical portion concentrically disposed relative to each other and axially joined at an upper end and a lower end by an upper supporting portion and a lower supporting portion, respectively, said outer substantially cylindrical portion, said inner substantially cylindrical portion, upper supporting portion, and said lower supporting defining an annular chamber extending entirely around an outer circumference of said inner substantially cylindrical portion, said annular chamber being filled with a fluid;

a longitudinal through hole formed axially through a center of said inner substantially cylindrical portion for receiving a hooking member;

an upper cylindrical partition extending downwardly from an inner surface of said upper supporting portion into said annular chamber, said upper cylindrical partition being integrally formed with said inner surface of said upper supporting portion; and a lower cylindrical partition extending upwardly from an inner surface of said lower supporting portion into said annular chamber, said lower cylindrical partition being integrally formed with said inner surface of said lower supporting portion;

wherein said upper cylindrical partition and said lower cylindrical are overlapped with each other to divide said annular chamber into an inner air chamber and an outer air chamber.

16. An air spring as claimed in claim 15, wherein a hardness of said resilient material is below 30 Shore (A).

17. An air spring as claimed in claim 15, wherein said inner substantially cylindrical portion and said outer substantially cylindrical are thinner than said upper supporting portion and said lower supporting portion.

18. An air spring as claimed in claim 15, wherein a ratio of horizontal stiffness to vertical stiffness of said body is 0.7 to 1.5.

19. An air spring as claimed in claim 15, wherein a spiral reinforcing projector member is formed on an inner peripheral wall of said inner substantially cylindrical portion.

20. An air spring as claimed in claim 15, wherein a plurality of annular projecting members are formed on an outer peripheral wall of said outer substantially cylindrical portion.

21. An air spring as claimed in claim 15, wherein said upper supporting portion and said lower supporting portion comprise at least one circular reinforcing metal plate.

22. An air spring as claimed in claim 15, one of said inner air chamber and said outer air chamber is made narrower than the other.

23. An air spring structure free from the shakes of a suspended rotator as claimed in claim 15, a plurality of ventilating grooves are vertically formed on peripheral surfaces of said upper cylindrical partition and said lower cylindrical partition contacting each other.

24. An air spring for suppressing shaking of a suspended rotator, said air spring comprising:

a body made of resilient material comprising an outer substantially cylindrical portion and an inner substantially cylindrical portion concentrically disposed relative to each other and axially joined at an upper end and a lower end by an upper supporting portion and a lower supporting portion, respectively, said outer substantially cylindrical portion, said inner substantially cylindrical portion, upper supporting portion, and said lower supporting portion defining an annular chamber extending entirely around an outer circumference of said inner substantially cylindrical portion, said annular chamber being filled with air therein;

a longitudinal through hole formed axially through a center of said inner substantially cylindrical portion for receiving a hooking member; and a pressure regulating tube member communicating said annular chamber with the atmosphere.

25. An air spring as claimed in claim 24, wherein a hardness of said resilient material is below 30 Shore A.

26. An air spring as claimed in claim 24, wherein said inner substantially cylindrical portion and said outer substantially cylindrical are thinner than said upper supporting portion and said lower supporting portion.

27. An air spring as claimed in claim 24, wherein a ratio of horizontal stiffness to vertical stiffness of said body is 0.7 to 1.5.

28. An air spring as claimed in claim 24, wherein a spiral reinforcing projector member is formed on an inner peripheral wall of said inner substantially cylindrical portion.

29. An air spring as claimed in claim 24, wherein a plurality of annular projecting members are formed on an outer peripheral wall of said outer substantially cylindrical portion.

30. An air spring as claimed in claim 24, wherein said upper supporting portion and said lower supporting portion comprise at least one circular reinforcing metal plate.

31. An air spring as claimed in claim 1, wherein said air spring isolates a suspended rotator in a washing machine.

32. An air spring as claimed in claim 1, wherein said upper supporting portion engages a bracket for supporting said suspended rotator.

33. An air spring as claimed in claim 1, wherein said lower supporting portion engages said hooking member.

34. An air spring as claimed in claim 8, wherein said upper supporting portion engages a bracket supporting said suspended rotator.

35. An air spring as claimed in claim 8, wherein said lower supporting portion engages said hooking member.

36. An air spring as claimed in claim 15, wherein said upper supporting portion engages a bracket supporting said suspended rotator.

37. An air spring as claimed in claim 15, wherein said lower supporting portion engages said hooking member.

38. An air spring as claimed in claim 24, wherein said upper supporting portion engages a bracket supporting said suspended rotator.

39. An air spring as claimed in claim 24, wherein said lower supporting portion engages said hooking member.

40. An air spring comprising:
a body comprising a resilient outer portion having a longitudinal through-hole; a resilient inner portion concentrically positioned inside of said longitudinal through-hole of said outer portion; a first supporting portion sealedly joining said outer portion and said inner portion at first longitudinal ends of said outer portion and said inner portion; and a second supporting portion sealedly joining said outer portion and said inner portion at second longitudinal ends of said outer portion and said inner portion;
wherein a first sealed annular cavity is defined by said outer portion, said inner portion, said first supporting portion, and said second supporting portion, said first sealed annular cavity extending annularly around an outer circumference of said inner portion.

41. An air spring as claimed in claim 40, wherein said first supporting portion and said second supporting portion are for engaging a first machinery support and a second machinery support, respectively, to suppress transmission of vibrations between said first machinery support and said second machinery support.

42. An air spring as claimed in claim 40, wherein said outer portion is substantially cylindrical in shape and includes a necked down portion angling inward to join with said first supporting portion.

43. An air spring as claimed in claim 40, wherein said outer portion comprises reenforcing ribs disposed on an outer surface.

44. An air spring as claimed in claim 40, wherein said inner portion comprises reenforcing ribs disposed on an inner surface.

45. An air spring as claimed in claim 40, wherein said second supporting portion includes a second sealed annular cavity communicating with said first sealed annular cavity via an air portal.

46. An air spring as claimed in claim 40, wherein a hardness of said outer portion and said inner portion does not exceed 40 Shore (A).

47. An air spring as claimed in claim 40, wherein said first supporting portion comprises a first partition extending away from said first supporting portion into said first sealed annular cavity and said second supporting portion comprises a second partition extending away from said second supporting portion into said first sealed annular cavity, said first partition and said second partition each having regions overlapping each other to thereby radially divide said first sealed annular cavity.

48. An air spring as claimed in claim 40, further comprising pressure regulating tube means for communicating said first sealed annular cavity with sealed annular cavities of other air springs collectively supporting a piece of machinery.

49. An air spring as claimed in claim 41, wherein said second machinery support comprises a hooking member extending downward through a longitudinal through-hole formed through said inner portion to engage a bottom of said second supporting portion.

50. An air spring as claimed in claim 40, wherein said inner portion and said outer portion are cylindrical in shape.

51. An air spring as claimed in claim 40, wherein said first supporting portion and said second supporting portion each comprise a circular metal reenforcing plate embedded in resilient material.

* * * * *

UNITED STATES PATENT AND TRADEMARK OFFICE
CERTIFICATE OF CORRECTION

PATENT NO. : 5,248,132
DATED : September 28, 1993
INVENTOR(S) : Kun S. Jung

It is certified that error appears in the above-indentified patent and that said Letters Patent is hereby corrected as shown below:

Column 2,

Line 40,     change "beavy" to --heavy--;

Line 66,     change "wr" to --or--;

Column 5,

Line 42,     change "average ,hickness" to --average thickness--.

Signed and Sealed this

Thirteenth Day of September, 1994

Attest:

BRUCE LEHMAN

Attesting Officer      *Commissioner of Patents and Trademarks*